(12) United States Patent
Zhang et al.

(10) Patent No.: US 8,069,758 B2
(45) Date of Patent: Dec. 6, 2011

(54) HEAD SECTION FOR A ROTARY CUTTING DEVICE

(75) Inventors: Jack Zhang, Tianjin (CN); George King, Alpharetta, GA (US)

(73) Assignee: Shakespeare Company, LLC, Columbia, SC (US)

( * ) Notice: Subject to any disclaimer, the term of this patent is extended or adjusted under 35 U.S.C. 154(b) by 781 days.

(21) Appl. No.: 12/074,619

(22) Filed: Mar. 4, 2008

(65) Prior Publication Data
US 2009/0226266 A1    Sep. 10, 2009

(51) Int. Cl.
B26B 7/00    (2006.01)
B26B 9/00    (2006.01)
B26D 7/26    (2006.01)

(52) U.S. Cl. .............. 83/13; 30/276; 30/347; 83/698.41
(58) Field of Classification Search ............... 30/276, 30/347; 56/12.7, 295; 83/698.41, 699.21
See application file for complete search history.

(56) References Cited

U.S. PATENT DOCUMENTS

| | | | |
|---|---|---|---|
| 4,249,310 A | | 2/1981 | Howard, Jr. et al. |
| 5,493,785 A | * | 2/1996 | Lawrence .................. 30/347 |
| 5,622,035 A | * | 4/1997 | Kondo et al. ............... 56/12.7 |
| 5,640,836 A | * | 6/1997 | Lingerfelt ................... 56/255 |
| 5,722,172 A | * | 3/1998 | Walden ....................... 30/347 |
| 5,887,349 A | * | 3/1999 | Walden ....................... 30/347 |
| 6,662,698 B2 | * | 12/2003 | Wheeler et al. ............ 83/699.21 |
| 6,912,789 B2 | * | 7/2005 | Price, III .................... 30/276 |
| 2008/0010836 A1 | | 1/2008 | Iacona |

FOREIGN PATENT DOCUMENTS

DE    17 82 084    7/1971
FR    2 792 162    10/2000

OTHER PUBLICATIONS

U.S. Appl. No. 10/172,203, filed Jan. 27, 2004.

* cited by examiner

*Primary Examiner* — Ghassem Alie
*Assistant Examiner* — Bharat C Patel
(74) *Attorney, Agent, or Firm* — Michael J. Corrigan

(57) ABSTRACT

A head section for a rotary cutting device includes a body portion that includes a blade passage defined between a blade entrance opening and a blade exit opening. A blade fastening mechanism is positioned in the blade passage and includes a blade engaging member. The blade engaging member is biased by a biasing mechanism to extend across the blade passage at a blade install position. The blade engaging member is movable against the bias to clear the blade passage. A blade having a mount aperture proximate an insertion end thereof is secured to the body portion when the mount aperture occupies the blade mount position and the blade engaging member extends through the mount aperture. The blade can be installed in and removed from the head section without tools, simply by advancing the blade through the blade passage.

8 Claims, 6 Drawing Sheets

HEAD SECTION FOR A ROTARY CUTTING DEVICE

TECHNICAL FIELD

The present invention generally relates to a head section for a rotary cutting device. More particularly, it relates to a head section having particular mechanisms for facilitating the installation and removal of blades therefrom. This invention also relates to a method for installing a blade and a method for removing a blade from a head section for a rotary cutting device.

BACKGROUND OF THE INVENTION

As is known, some head sections for rotary cutting devices employ blades that extend outwardly from the head section such that, when the head section is rotated, the blades are also rotated to cut vegetation or other items as necessary. The blades are typically secured to the head section by screw connections or doweling so as to fasten the blades respectively between a body portion and a cap portion, and the cap portion needs to be removed in order to change a damaged or worn-out blade. The body and cap structures thus present an inconvenience when changing the blades, and there is a possibility of incorrect assembly, which may affect operational safety. In other head sections, special tools must be used to mount and remove blades, and such is also undesirable, as a tool-less mount and removal is preferable.

Thus, a need exists for a head section for a rotary cutting device, wherein the head section employs blades and provides blade fastening mechanisms whereby a blade can be installed or removed from the head section without having to disassemble any portion of the head section. A need also exists to provide a head section where the blades can be mounted and removed without the use of tools.

SUMMARY OF THE INVENTION

In general, the present invention provides a head section for a rotary cutting device. The head section includes a body portion that includes a blade passage defined between a blade entrance opening and a blade exit opening. A blade fastening mechanism is positioned in the blade passage and includes a blade engaging member. The blade engaging member is biased by a biasing mechanism to extend across the blade passage at a blade install position. The blade engaging member is movable against the bias to clear the blade passage. A blade having a mount aperture proximate an insertion end thereof is secured to the body portion when the mount aperture occupies the blade mount position and the blade engaging member extends through the mount aperture.

The present invention also provides a method for installing a blade into a head section of a rotary cutting device and removing an installed blade from the head section. In accordance with this method, a head section is provided including a body portion having a blade passage extending through the body portion and providing a blade entrance opening and a blade exit opening. A blade fastening mechanism includes a blade engaging member biased by a biasing mechanism to extend across the blade passage at a blade install position. The blade engaging member is movable against the bias to clear the blade passage. In accordance with the method, a blade is also provided having a blade body including a mount aperture proximate an insertion end of the blade. The mount aperture is defined by an aperture wall in the blade body. The blade is installed in the grass cutter head section at a blade mount position by advancing the mount aperture of the blade through the blade passage, from the blade entrance opening toward the blade exit opening, such that the insertion end contacts the blade engaging member extending across the blade passage and moves it against the bias of the biasing mechanism to clear the blade passage until the mount aperture of the blade reaches the blade engaging member and the blade engaging member moves into the mount aperture under the influence of the biasing mechanism. An installed blade is removed from the head section by advancing the mount aperture of the installed blade from the blade install position toward the blade exit opening such that the aperture wall contacts the blade engaging member extending across the blade passage and moves it against the bias of the biasing mechanism to clear the blade passage. Thereafter, the mount aperture of the blade is advanced toward the blade exit opening until the insertion end of the blade is accessible externally of the blade exit opening to permit removal of the blade therethrough.

PREFERRED EMBODIMENT FOR CARRYING OUT THE INVENTION

Figure 1:
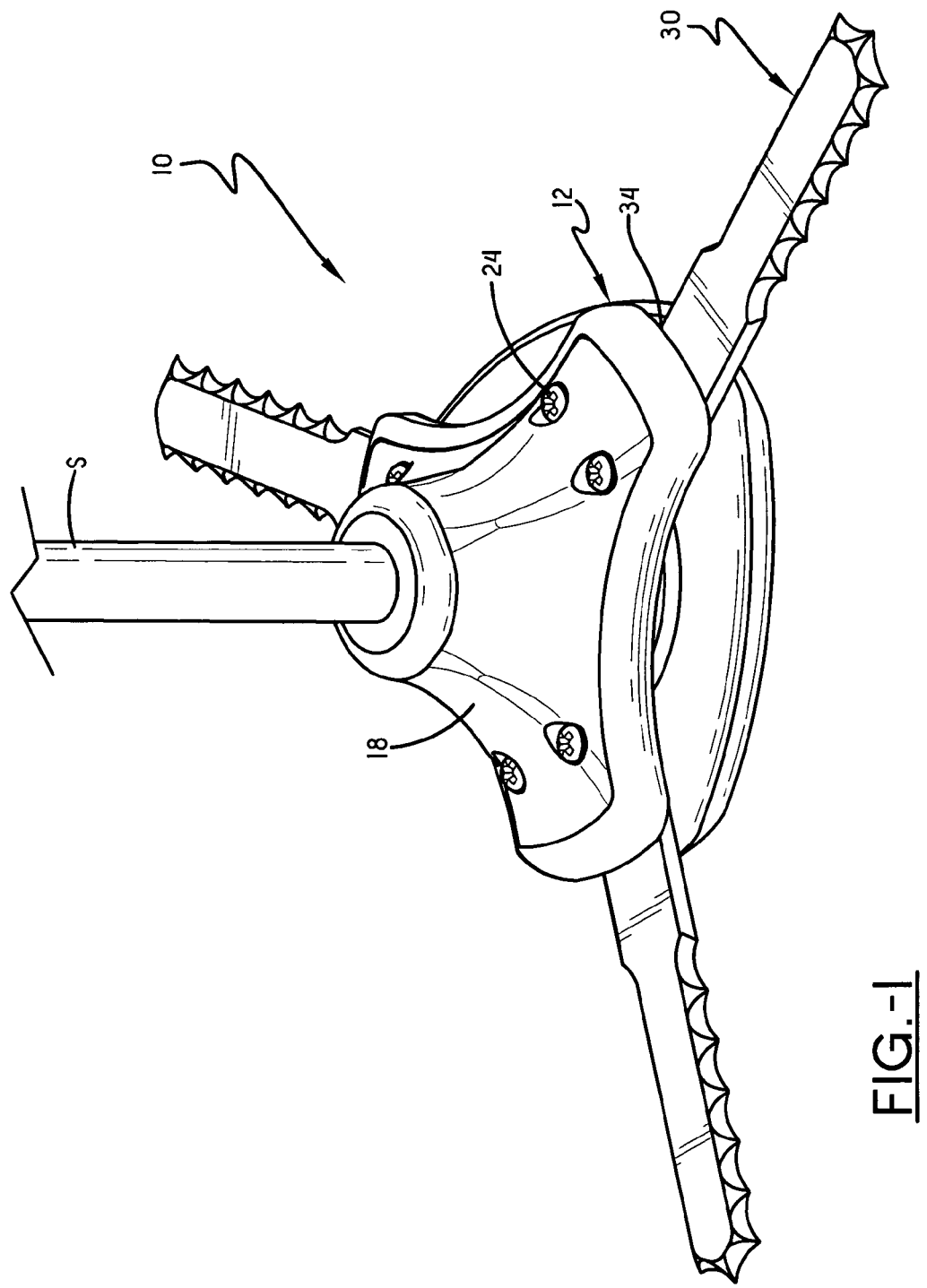
FIG. 1 is a perspective view of relevant portions of a rotary cutting device, showing the head section in accordance with this invention.
Figure 2:
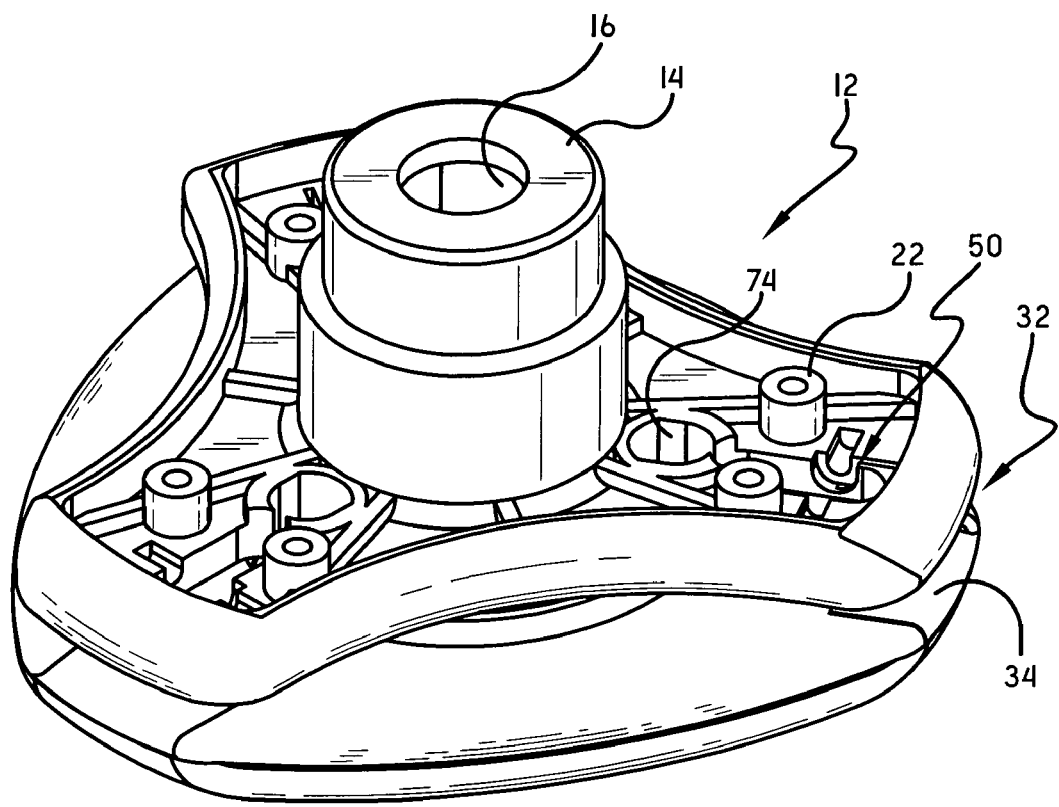
FIG. 2 is a perspective view of the head section of this invention, shown with the decorative cap portion removed from the body portion.

Referring now to FIGS. 1 and 2, a head section for a rotary cutting device in accordance with this invention is shown and designated by the numeral 10. Head section 10 includes body portion 12, which is preferably of one piece to simplify manufacturing and increase structural integrity. Body portion 12 includes axial member 14, which connects to the rotary shaft S of a rotary cutting device at axial bore 16. A decorative cap 18 is preferably provided to be removably secured to body portion 12, as shown by the employment of through apertures in cap 18, threaded bores 22, in body portion 12, and threaded fasteners 24. It will be readily appreciated that other means could be used for fastening the cap to the body portion.

In this embodiment, three blades 30 are secured to body portion 12 to extend outwardly therefrom for cutting vegetation during rotation of the head section 10 through operation of the rotary cutting device. It should be appreciated that the head section 10 could be shaped to accommodate more or less blades as desired. Preferably, each blade 30 is secured to body portion 12 in the same manner, and, referring now to FIGS.

3-6, the structures used to secure a blade 30 to body portion 12 are shown and described. Body portion 12 is structured to define a blade passage 32 for the receipt of blade 30. Blade passage 32 extends through body portion 12, from a blade entrance opening 34, at the periphery of body portion 12, to a blade exit opening 36, at a central cavity 38 in body portion 12. A fastening mechanism is positioned to interact with blade 30 as it is inserted into blade passage 32. The fastening mechanism is such that the operator of the rotary cutting device employing the head section 10 of this invention can quickly and easily either secure a blade 30 to head section 10 or remove blade 30 therefrom, for replacement or otherwise, without the use of any special tools.

Figure 4:
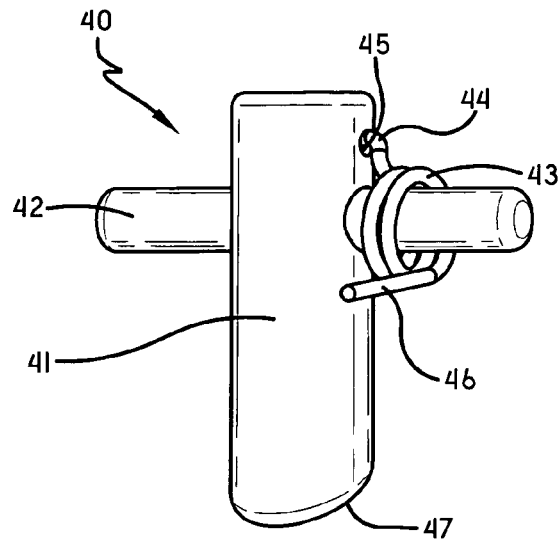
FIG. 4 is a perspective view of a blade fastening mechanism received in the head section.

With particular reference to FIG. 4, it can be seen that a first embodiment of a fastening mechanism is shown and designated by the numeral 40. Fastening mechanism 40 includes blade engaging member 41, extending from lateral pin 42. Torsional spring 43 is mounted on lateral pin 42 to act as a biasing member. More particularly, torsional spring 43 includes an arm 44 that extends into a bore 45 in that portion of blade engaging member 41 that extends above lateral pin 42. From arm 44, torsional spring 43 coils around lateral pin 42 and provides an extension 46. The torsional spring is loaded by relative movement between the arm 44 and extension 46, and serves to bias biasing blade engaging member 41 to a blade mount position in head section 10, as will be explained more fully below.

Figure 3:
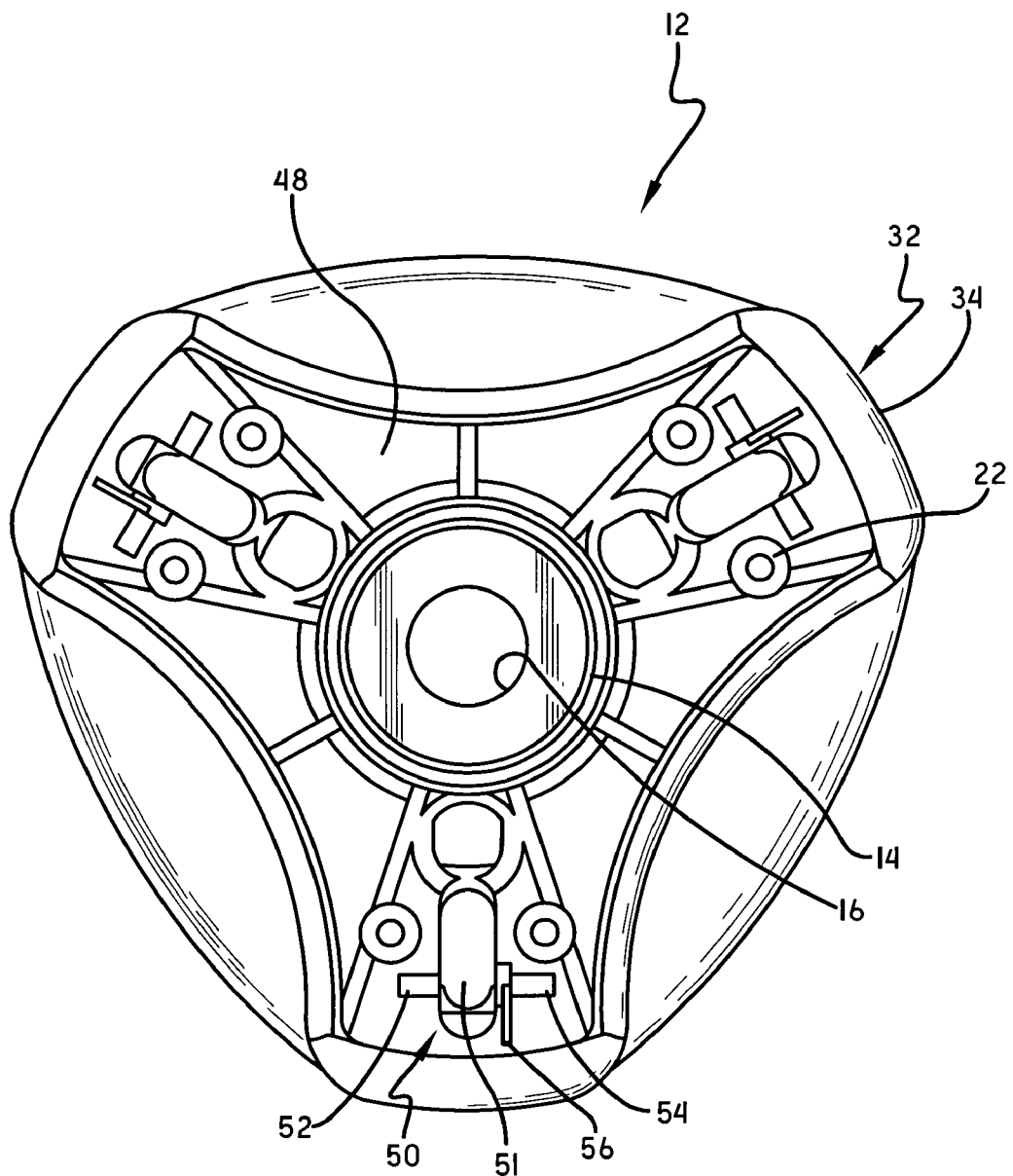
FIG. 3 is a top plan view of the body portion.

As seen in FIGS. 2 and 3, top surface 48 of body portion 12, which is accessed by the removal of cap 18, includes holding hole 50, defining a passage 51 from top surface 48 to blade passage 32. Holding hole 50 includes lateral pin receipt 52, extending into body portion 12, from top surface 48, to provide support surface 54 for lateral pin 42, and spring receipt 56, which is similarly formed to provide a support surface for an extension 46 (FIG. 4) of torsional spring 43. As appreciated from consideration of FIGS. 3, 5 and 6, fastening mechanism 40 is received in holding hole 50 with extension 46 of torsional spring 43 received in spring receipt 56, and with lateral pin 42 received in lateral pin receipt 52 such that blade engaging member 41 extends down through passage 51, across blade passage 32 and into stop channel 58 (FIGS. 5 and 6) formed in body portion 12. Torsional spring 43 urges blade engaging member 41 in the direction of arrow A so that distal end 47 of blade engaging member 41 contacts stop channel 58, positioning blade engaging member 41 transversely across blade passage 32. It should be apparent that removal of decorative cap 18 provides access to fastening mechanisms 40 and their respective holding holes 50.

In an embodiment of this invention, safety button 70 is biased by compression spring 72 to extend across blade passage 32 and block off blade exit opening 36. As seen in FIGS. 2 and 5-7, body portion 12 includes a safety button aperture 74 to receive safety button 70, and compression spring 72 is compressed between safety button 70 and the underside of cap 18 so as to constantly bias safety button 70 downwardly to the position of FIG. 5, blocking blade exit opening 36. Movement of safety button 70 is limited by contact between seat extension 76 of safety button 70 and stop surface 78 on body portion 12. Safety button 70 can be accessed at central cavity 38 to be pushed upwardly against compression spring 72 so that button 70 does not block blade passage 32. Safety button 70 helps ensure that blade 30 is not accidentally forced toward and into central cavity 38, as will be better appreciated from the disclosure that follows regarding securing and removing a blade 30 from head portion 10.

Figure 9:
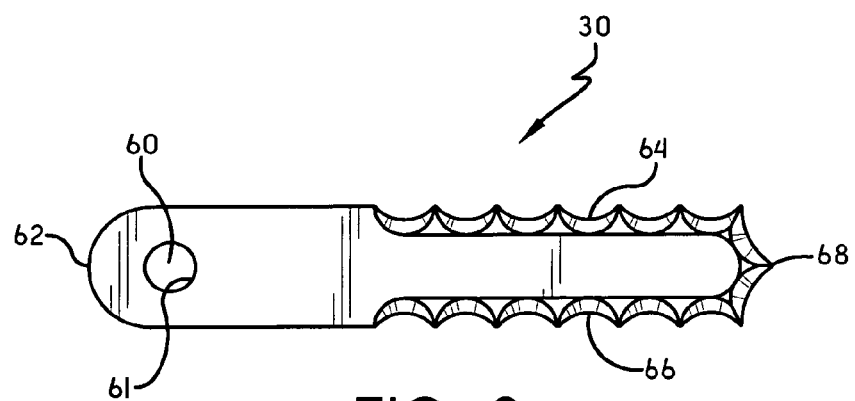
FIG. 9 is a top plan view of a blade
Figure 5:
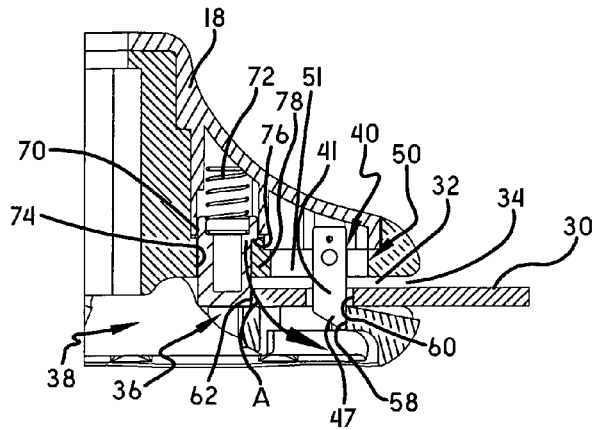
FIG. 5 is a cross-sectional view of the head section, showing a blade fastened to the head section by the blade fastening mechanism.
Figure 6:
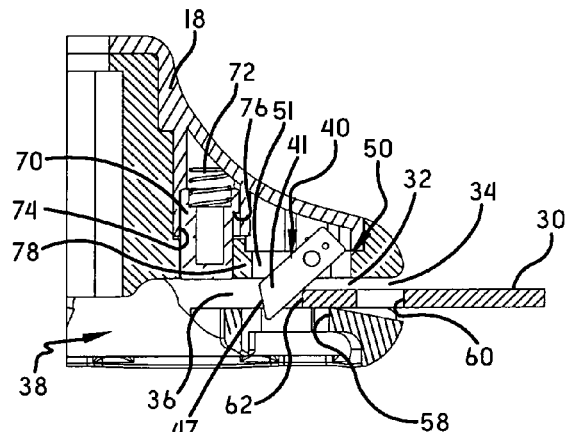
FIG. 6 is a cross-sectional view showing the interaction of a blade and the blade fastening mechanism during the initial mounting step for mounting a blade to the head section.
Figure 7:
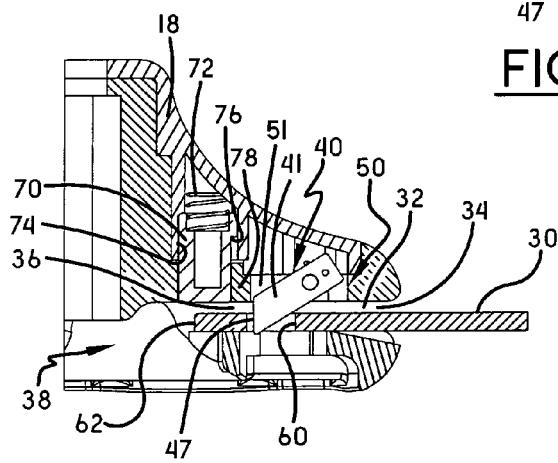
FIG. 7 is a cross-sectional view showing the interaction of a blade and the blade fastening mechanism during the initial removing step for removing a blade to the head section.

To describe how a blade is secured to and removed from head portion 10, the structure of a blade 30 is shown in FIG. 9. Blade 30 is provided with mount aperture 60, defined by aperture wall 61, proximate insertion end 62. Sides 64, 66 preferably provide appropriate cutting contours, as does distal end 68. As seen in FIGS. 5 and 6, to secure blade 30 to head section 10, insertion end 62 is advanced into blade passage 32 through blade entrance opening 34, toward blade exit opening 36 (FIG. 6). As insertion end 62 advances, it contacts that portion of blade engaging member 41 that extends across its path, and forces it to pivot opposite the direction of arrow A, on the support provided by lateral pin 42, against the bias of torsional spring 43. As seen in FIGS. 6 and 7, blade engaging member 41 is moved against the bias of torsional spring 43 until mount aperture 60 aligns with distal end 47 of blade engaging member 41. At this point, distal end 47 will be forced into mount aperture 60 under the bias of torsional spring 43, and it will be appreciated that the beveled surface of distal end 47 facilitates this entry into mount aperture 60. From this position, blade 30 is pulled back in the direction of blade entrance opening 34, which motion permits blade engaging member 41 to pivot under the force of torsional spring 43 to extend through mount aperture 60 and take up the blade mount position as shown in FIG. 5. During this mounting step, safety button 70 is pushed upwardly to open blade exit opening 36 and thereby permit insertion end 62 of blade 30 to extend into central cavity 38. This is necessary so that mount aperture 60 can align with blade engaging member 41 as just described. Once blade 30 is moved to the position of FIG. 5, safety button 70 will return to block blade exit opening 36 under the force of compression spring 72.

Figure 8:
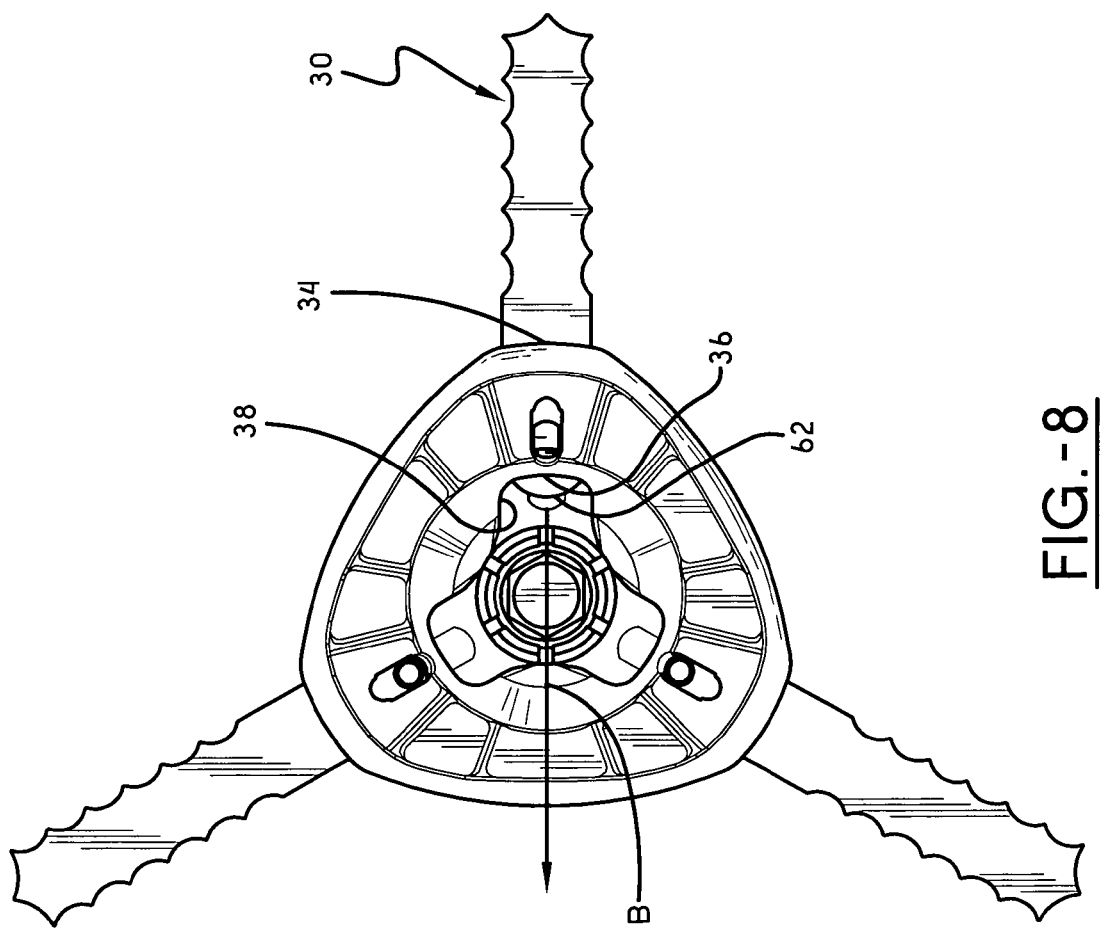
FIG. 8 is a bottom plan view taken from the bottom of the head section, showing a last step in removing a blade from the head section.

To remove blade 30 from head section 10, blade exit opening 36 is opened by pushing upwardly on safety button 70, and insertion end 62 of blade 30 is advanced from its position at the blade mount position of FIG. 5 toward blade exit opening 36. As insertion end 62 advances, aperture wall 61 forces blade engaging member 41 to pivot opposite the direction of arrow A, thus disengaging from mount aperture 60 and, eventually, insertion end 62 of blade 30 exits blade passage 32 at blade exit opening 36, and enters central cavity 38, as seen in FIG. 8. Once in the position shown in FIG. 8, insertion end 62 can be grasped, and the entire blade 30 can be removed from head portion 10 by pulling blade 30 in the direction of arrow B. From the forgoing it should be appreciated that the mounting and removal of the blades does not require any tools.

In light of the foregoing, it should thus be evident that the process of the present invention, providing a head section for a rotary cutting device, substantially improves the art. While, in accordance with the patent statutes, only the preferred embodiments of the present invention have been described in detail hereinabove, the present invention is not to be limited thereto or thereby. Rather, the scope of the invention shall include all modifications and variations that fall within the scope of the attached claims.

What is claimed is:

1. A head section for a rotary cutting device comprising:
   a body portion;
   a blade passage extending through said body portion from a blade entrance opening to a blade install position;
   a blade fastening mechanism having a blade engaging member pivotally movable between a first position and a second position, said blade engaging member biased by a biasing mechanism into the second position such that the blade engaging member extends across said blade passage at said blade install position, said blade engaging member being movable against such bias to clear said blade passage;
   a blade having a mount aperture proximate an insertion end thereof, wherein said blade is secured to said body portion when said mount aperture occupies said blade install position and said blade engaging member extends through said mount aperture; and wherein said blade is secured to said body portion by inserting said insertion end of said blade into said blade entrance opening and advancing said mount aperture through said blade passage toward said blade install position such that said insertion end contacts said blade engaging member and moves said blade engaging member to said first position to clear said blade passage, said blade engaging member having a longitudinal axis, and when in said first position, said blade engaging member is disposed in a recess in said body portion and said longitudinal axis is oriented substantially parallel to a longitudinal axis of said blade.

2. The head section of claim 1, wherein said body portion includes a central cavity defined therein, said central cavity having an open end at a bottom surface of said body portion and extending into said body portion.

3. The head section of claim 2, wherein a blade exit opening of said blade passage opens to said central cavity.

4. The head section of claim 3, further comprising a safety button biased by a biasing mechanism to extend across said blade passage and block said blade exit opening, said safety button being movable against such bias to clear said blade passage and open said blade exit opening.

5. The head section of claim 1, wherein said mount aperture is advanced through said blade passage toward said blade install position until said mount aperture reaches said blade engaging member and said blade engaging member moves into said mount aperture under the influence of said biasing mechanism to occupy said blade install position.

6. The head section of claim 5, wherein said biasing mechanism is a torsional spring.

7. The head section of claim 6, wherein said torsional spring is secured to said blade engaging member.

8. The head section of claim 1, wherein said blade is pivotally secured to said body about said blade engaging member.

* * * * *